United States Patent
Christe et al.

(10) Patent No.: US 11,705,804 B2
(45) Date of Patent: Jul. 18, 2023

(54) CONTROL OF AN ICBT CONVERTER

(71) Applicant: ABB Schweiz AG, Baden (CH)

(72) Inventors: Alexandre Christe, Veysonnaz (CH); Yuhei Okazaki, Västerås (SE); Michele Luvisotto, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/631,116

(22) PCT Filed: Aug. 6, 2020

(86) PCT No.: PCT/EP2020/072097
§ 371 (c)(1),
(2) Date: Jan. 28, 2022

(87) PCT Pub. No.: WO2021/023807
PCT Pub. Date: Feb. 11, 2021

(65) Prior Publication Data
US 2022/0278629 A1    Sep. 1, 2022

(30) Foreign Application Priority Data
Aug. 7, 2019 (EP) .................................... 19190515

(51) Int. Cl.
*H02M 7/483* (2007.01)
*H02M 7/497* (2007.01)
*H02M 1/092* (2006.01)

(52) U.S. Cl.
CPC .......... *H02M 1/092* (2013.01); *H02M 7/4835* (2021.05); *H02M 7/497* (2013.01)

(58) Field of Classification Search
CPC ..... H02M 7/4835; H02M 7/497; H02M 1/092
See application file for complete search history.

(56) References Cited

U.S. PATENT DOCUMENTS

| | | | |
|---|---|---|---|
| 2011/0018481 A1* | 1/2011 | Hiller | H02M 7/483 318/400.26 |
| 2012/0170338 A1* | 7/2012 | Trainer | H02M 7/483 363/127 |
| 2012/0195084 A1* | 8/2012 | Norrga | H02M 7/4835 363/127 |

FOREIGN PATENT DOCUMENTS

| | | |
|---|---|---|
| CN | 106208704 A | 12/2016 |
| CN | 107834867 B | 11/2018 |
| EP | 2953255 A1 | 12/2015 |

OTHER PUBLICATIONS

Bensraj, R., et al.; "Bipolar trapezoidal amalagated rectangular reference function for improved performance PWM multilevel inverter"; 2012 International Conference on Computing, Electronics and Electrical Technologies (ICCEET) Nagercoil, India; Mar. 21, 2012; 7 Pages.

(Continued)

*Primary Examiner* — Jue Zhang
(74) *Attorney, Agent, or Firm* — Whitmyer IP Group LLC

(57) ABSTRACT

A voltage source converter as well as a method and computer program product for controlling the converter. The converter includes at least one phase leg connected between a first DC terminal having a first voltage and a second DC terminal having a second voltage, the phase leg including an upper arm and a lower arm with cells, where a junction between the arms is connected to a corresponding AC terminal. The converter also includes a control unit configured to control the cells to output a train of pulses of trapezoidal shape where the generation of a first control signal for a first cell used to initiate a transition between two levels of a pulse coincides with the decision that a transition is to be made.

16 Claims, 8 Drawing Sheets

(56) References Cited

OTHER PUBLICATIONS

Gowaid, I. A., et al.; "Quasi Two-Level Operation of Modular Multilevel Converter for Use in a High-Power DC Transformer With DC Fault Isolation Capability"; 2015 IEEE Transactions on Power Electronics, vol. 30, No. 1; Feb. 14, 2014; 17 Pages.
Mertens, Axel, et al.; "Quasi Two-Level PWM Operation of an MMC Phase Leg With Reduced Module Capacitance"; 2016 IEEE Transactions on Power Electronics, vol. 31, No. 10; May 20, 2016; 5 Pages.
Bharathi, B. V. V. L. Kala, et al.; "Comparative analysis of multi carrier PWM eleven level inverter with two modulation waves"; 2017 IEEE International Conference on Power, Control, Signals and Instrumentation Engineering (ICPCSI); Chennai, India; Sep. 21, 2017; 9 Pages.
Kumar, Mahesh; "Analysis, Comparison & Simulation of Three Phase 9 Level Cascaded Multilevel Inverter with Advanced Modulation Control Techniques using Less Switches"; 2018 Second International Conference on Advances in Electronics, Computer and Communications (ICAECC); Bangalore, India; Feb. 9, 2018; 6 Pages.
International Search Report and Written Opinion of the International Searching Auhtority; Application No. PCT/EP2020/072097; Completed: Sep. 9, 2020; dated Sep. 18, 2020; 18 Pages.
Extended European Search Report; Application No. 19190515.7; Completed: Feb. 19, 2020; dated Feb. 26, 2020; 8 Pages.

\* cited by examiner

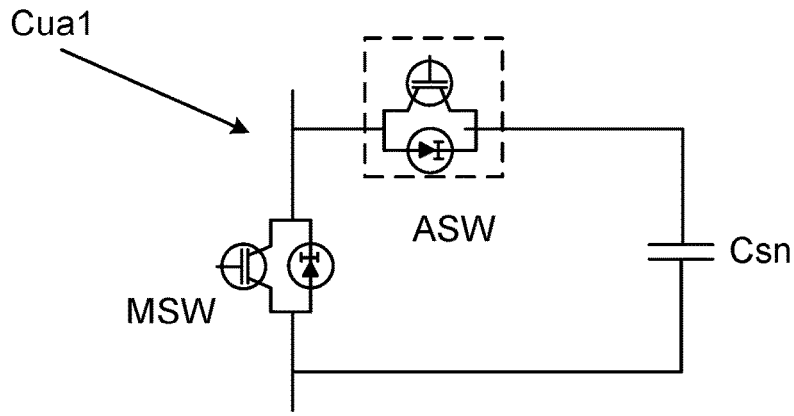

Fig. 2

```
┌─────────────────────────────────────────────────────────────┐
│ Control cells to output a train of pulses of trapezoidal shape where │
│  the generation of a first control signal used to initiate a transition │
│  between two levels of a pulse coincides with the decision that a │
│                   transition is to be made                     │   14
│  ┌─────────────────────────┐  ┌─────────────────────────┐   │
│  │   Control the first and a  │  │   Control the first and a  │   │
│  │ second cell with a first and │14a│ second cell with a first and │14b│
│  │    second control signal    │  │    second control signal,   │   │
│  │    where the first control  │  │    where the first control  │   │
│  │    signal starts before the │  │   signal starts  before the │   │
│  │ second control signal starts│  │    second control signal    │   │
│  │    and ends before the     │  │   starts and ends after the │   │
│  │  second control signal ends │  │  second control signal ends │   │
│  └─────────────────────────┘  └─────────────────────────┘   │
└─────────────────────────────────────────────────────────────┘
```

Fig. 3

CONTROL OF AN ICBT CONVERTER

TECHNICAL FIELD

The present invention relates to a voltage source converter as well as to a method and computer program product for controlling a voltage source converter.

BACKGROUND

The Modular Multilevel Converter (MMC) is frequently used in different high voltage applications. The MMC employs submodules in phase arms between two Direct Current (DC) terminals for forming a sinusoidal waveform, such as an Alternating Current (AC) waveform. Such submodules comprise a pair of switches in parallel with a capacitor.

The Quasi-Two Level (Q2L) conversion technique has been introduced in various high-voltage applications, such as in power transmission and distribution systems. The Q2L conversion technique uses cells that resemble the submodules of the MMC. A Q2L converter more particularly uses two converter arms with cells, which are connected in parallel with DC link capacitors. The cells comprise a main switch in parallel with an auxiliary switch and a snubber capacitor. However, in the Q2L technique a single pulse train with pulses between two voltage levels is generated using the cells. This type of technique is for instance described by Gowaid et al in "Quasi Two-Level Operation of Modular Multilevel Converter for Use in a High-Power DC Transformer With DC Fault Isolation Capability", IEEE Transactions On Power Electronics, Vol. 30, No. 1, January 2015. It is also described by Mertens and Kucka in "Quasi Two-Level PWM Operation of an MMC Phase Leg With Reduced Module Capacitance", IEEE Transactions On Power Electronics, Vol. 31, No. 10, October 2016. The Q2L converter is in many instances also referred to as an integrated capacitor-blocked transistor (ICBT) converter.

The ICBT converter can be considered to be an intermediate step between a standard two-level (2 L) converter and an MMC. It makes steps with a dwell time of $t_D$ during the transition between the two voltage levels present in the phase voltage waveform of a 2L converter. This is done in order to limit the dv/dt produced by the converter during this transition. Higher values of dv/dt can result in increased electromagnetic interference (EMI) and insulation stress on reactors connected to the converter. Moreover, in the ICBT converter, there are no requirements on synchronous switching of series-connected power devices as the series connection relies on active snubber and not on advanced gate unit.

The ICBT converter has an advantage compared to the MMC in that the required capacitance per cell is much lower than the corresponding capacitance per submodule. This reduction in capacitance occurs because each cell capacitance only charges or discharges during the time when transition between the upper and lower arms of one phase leg occurs. This is a significantly smaller charging/discharging time than what is seen by the submodule capacitors in an MMC.

As compared with the MMC the transition between two levels in the output waveform is thereby fast and this puts a high demand on the control. There is therefore a need for improvements with regards to the control of the ICBT converter.

SUMMARY

The present invention is directed towards improving the control of a voltage source converter operating as an integrated capacitor-blocked transistor converter.

This object is according to a first aspect achieved through a voltage source converter comprising at least one phase leg connected between a first DC terminal having a first voltage and a second DC terminal having a second voltage, the phase leg comprising an upper arm and a lower arm with cells, where the junction between the arms is connected to a corresponding AC terminal, the converter further comprising a control unit configured to:
control the cells to output a train of pulses of trapezoidal shape, where the generation of a first control signal for a first cell used to initiate a transition between two levels of a pulse coincides with the decision that a transition is to be made.

The object is according to a second aspect achieved through a method of controlling a voltage source converter comprising
at least one phase leg connected between a first DC terminal having a first voltage and a second DC terminal having a second voltage, the phase leg comprising an upper arm and a lower arm with cells, where the junction between the arms is connected to a corresponding AC terminal, the method comprising:
controlling the cells of the phase leg to output a train of pulses of trapezoidal shape, where the generation of a first control signal for a first cell used to initiate a transition between two levels of a pulse coincides with a decision that a transition is to be made.

The object is according to a third aspect achieved through a computer program product for controlling a voltage source converter comprising at least one phase leg connected between a first DC terminal having a first voltage and a second DC terminal having a second voltage, each phase leg comprising an upper arm and a lower arm with cells, where the junction between the arms is connected to a corresponding AC terminal, the computer program product comprising a data carrier with computer program code configured to cause a control unit to, when the computer program code is loaded into the control unit:
control the cells of the phase leg to output a train of pulses of trapezoidal shape, where the generation of a first control signal for a first cell used to initiate a transition between two levels of a pulse coincides with a decision that a transition is to be made.

Through the generation of the first control signal coinciding with the decision that a transition is to be made, there is no delay between this transition decision and the generation of the first control signal. The generation of the first control signal can alternatively be considered to follow the transition decision without delay.

The decision that a transition is to be made may be carried out through a comparison between a carrier and a reference performed for the first cell. The reference may additionally be a sinusoidal reference.

Furthermore, either the carrier or the reference may be dedicated to the first cell and the other may be common for all the cells.

Thereby the start of a first control signal generated for the first cell and used to initiate a transition between two levels of a pulse coincides with the decision that a transition is to be initiated, where the decision that a transition is to be initiated may be made through a comparison between a carrier and a reference performed for the first cell.

The transition from one level to the other may be made up of a number of steps made during a dwell time. The separation between the steps may depend on the dwell time, the number of cells used in the transition, the pulse number and an AC frequency at the AC terminal. The separation may more particularly depend on a quotient between the dwell time and the number of cells times a product comprising the pulse number and the AC frequency, where the pulse number is the ratio between the AC frequency and the used switching frequency in the converter.

According to a first variation of the first aspect at least one cell of the phase leg is controlled with a corresponding control signal, the starting point of which is adjusted in relation to the control signals provided for at least one of the other cells in the phase leg so that the first control signal for the first cell starts before a second control signal for a second cell starts.

According to a corresponding variation of the second aspect, the controlling comprises controlling at least one cell of the phase leg with a corresponding control signal, the starting point of which is adjusted in relation to the control signals provided for at least one of the other cells in the phase leg so that the first control signal for the first cell starts before a second control signal for a second cell starts.

It is possible that the first control signal for the first cell ends before the second control signal for the second cell ends. In this case it is also possible that the control signals have equal lengths.

Alternatively, the first control signal for the first cell may end after the second control signal for the second cell ends. In this case the first control signal may be the longest and the following control signals in a sequence of control signals used to make the transition may have diminishing lengths according to the order in the sequence.

According to another variation, the control signals are generated through comparing a group of phase-shifted carriers with a reference, where each carrier in the group is associated with each cell that is to receive a corresponding control signal. The phase shift may in this case depend on the dwell time, the number of cells used in the transition, the pulse number and an AC frequency at the AC terminal. The separation may more particularly depend on the dwell time divided by the number of cells minus one times a product comprising the pulse number and the AC frequency.

Alternatively, the control signals may be generated through comparing a carrier with a group of references that are offset from each other, where each reference in the group is associated with each cell that is to receive a corresponding control signal. Also, the offset may case depend on the dwell time, the number of cells used in the transition, the pulse number and an AC frequency at the AC terminal. The offset may depend on the dwell time divided by the number of cells minus one times a product comprising the pulse number and the AC frequency.

As yet another alternative, data about the control signals is pre-stored in a table and fetched therefrom for application to the cells.

According to another variation, the cells of a phase leg used to form the pulse train each receive a separate control signal. These separate control signals may be timed differently from each other.

As an alternative at least two cells in a phase leg used to form the pulse train may receive the same control signal. In this case the length of the step in the transitioning of the pulse caused by the control signal may be longer than the corresponding individual steps of differing control signals.

The control unit may additionally comprise a control module in which the control signals for at least a cluster of the cells in a phase arm are generated and the control module may additionally have a number of direct links to the cells in the cluster. These links may be optical point-to-point links. As an alternative they may be separate time division multiple access time slots of a wireless time division multiple access frame.

The AC terminal may be an AC terminal for connection to an AC system.

The invention has a number of advantages. It speeds up the control in that it avoids the use of a delay in the forming of pulses. The control scheme used may also be simplified.

BRIEF DESCRIPTION OF THE DRAWINGS

The present invention will in the following be described with reference being made to the accompanying drawings, where FIG. 1 schematically shows a cell-based voltage source converter, FIG. 2 shows a half-bridge cell for use in the converter of FIG. 1, FIG. 3 shows a flow chart of a number of method steps in a method of controlling the converter, FIG. 4 schematically shows a conversion from a two-level pulse pattern into a trapezoidal pulse pattern, FIG. 5a shows the curves for a complete period and FIG. 5b the curves around 180°, FIG. 6a shows the curves for a complete period and FIG. 6b the curves around 180°, FIG. 7a shows the differences between control signals for a complete period and FIG. 7b the differences between control signals around 180°.

DETAILED DESCRIPTION

In the following, a detailed description of preferred embodiments of the invention will be given.

Figure 1:
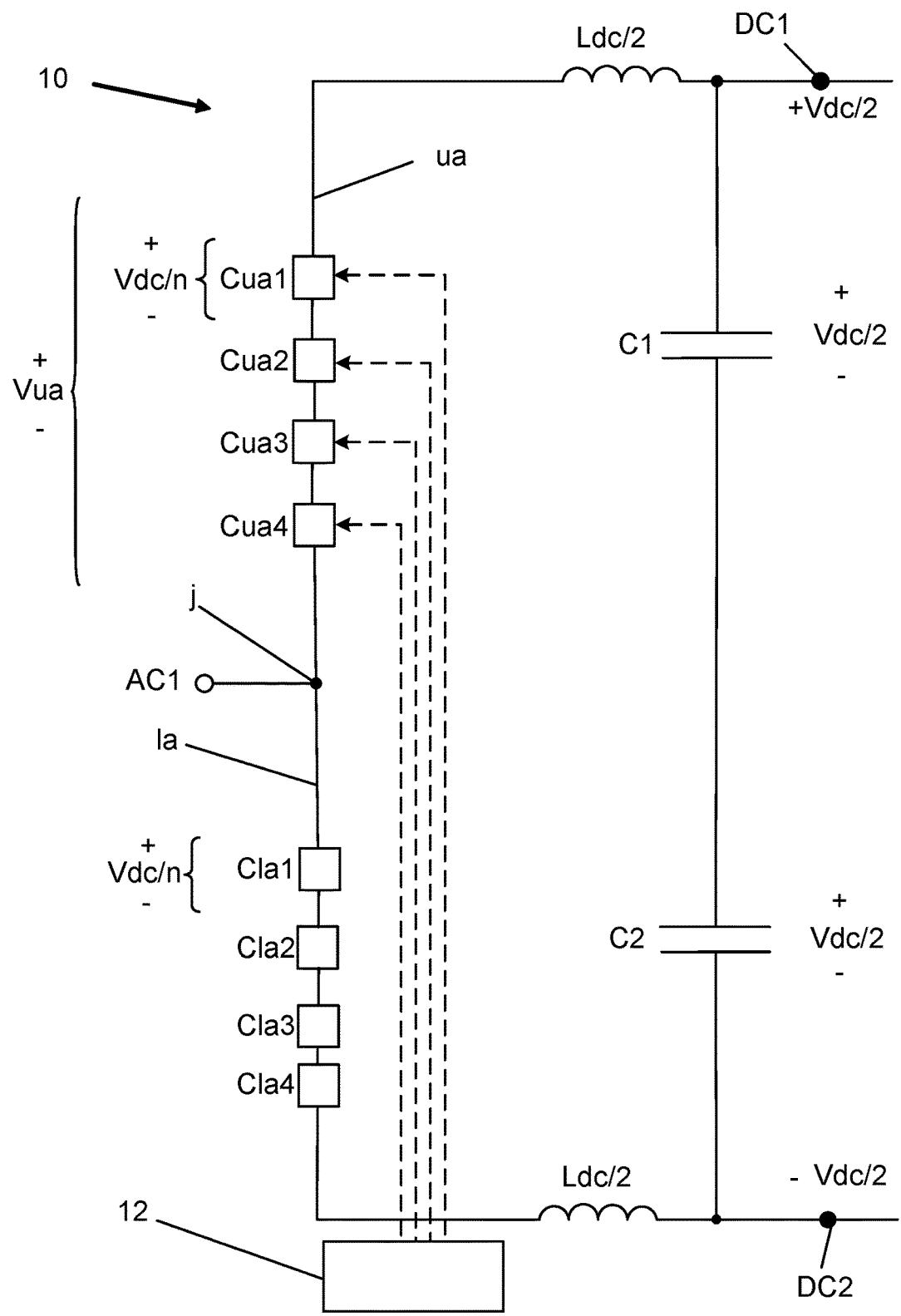

FIG. 1 shows one variation of a converter in the form of a cell-based voltage source converter (VSC) 10. The converter operates to convert between alternating current (AC) and direct current (DC). The converter 10 in FIG. 1 is shown as comprising two arms, which two arms are related to a single AC phase. It should however be realized that there may be three different phases and thus a totality of six different arms, with two arms for each phase.

As can be seen in the figure there is a first upper converter arm ua having a first end connected to a first DC terminal DC1 via an upper link inductor Ldc/2 and a second end connected to a first junction j. There is also a second lower converter arm la having a first end connected to the junction j and a second end connected to a second DC terminal DC2 via a lower link inductor Ldc/2. There is also a string of capacitors C1 and C2 connected between the first and second DC terminals DC1 and DC2. At the junction j there is also provided a first AC terminal AC1 on which an output voltage is provided.

In a three-phase case there would be three groups of arms, where each group comprises an upper arm and a lower arm connected to a corresponding AC terminal, with the first arms of all groups being connected to the first DC terminal and all second arms connected to the second DC terminal.

The first DC terminal DC1 may be connected to a first pole of a DC power transmission system, such as a High Voltage Direct Current (HVDC) power transmission system and the second DC terminal DC2 may be connected to a second pole of the same system.

The first DC terminal DC1 furthermore has a first potential or voltage level +Vdc/2 that may be positive. The first pole may therefore also be termed a positive pole. The second DC terminal DC2 has a second potential or voltage level −Vdc/2 and the second pole may therefore be termed a negative pole. The AC terminal AC1 may be connected to an AC system, for instance via a transformer.

As mentioned above, the type of voltage source converter shown in FIG. 1 is only one example of a converter where the invention may be used. It is for instance possible to use the converter as a reactive compensating device, such as a Static Compensator.

The voltage source converter depicted in FIG. 1 has a symmetric monopole configuration. It is thus connected between a positive and negative potential. As an alternative it may be connected in an asymmetric monopole configuration or a symmetric bipole configuration.

In the example given in FIG. 1 there are four series-connected or cascaded cells in the upper and lower arms ua and Ia. Thus, the upper arm ua includes four cells Cua1, Cua2, Cua3 and Cua4, while the lower arm Ia includes four cells Cla1, Cla2, Cla3 and Cla4. Across each cell there is a voltage of Vdc/n, where n is the number of cells in the upper and lower arms, which means that the sum of cells in an arm provides the voltage of Vdc. However, the rating of the cells in the arm in the converter in FIG. 1 is typically Vdc/n. Also, the upper arm voltage Vua is indicated.

The number of cells provided in FIG. 1 is only an example. It therefore has to be stressed that the number of cells in an arm may vary, where the number typically depends on the shape that is to be created in the AC terminal AC1 and more particularly the time derivative of the shape often referred to as dV/dt, and the magnitude of the voltages involved. The number also has a dependence on the semi-conductor device blocking voltage.

There is also a control unit 12 provided for controlling all the arms of the converter 10. However, in order to simplify the figure only the control of the cells Cua1, Cua2, Cua3 and Cua4 in the upper arm ua are indicated with dashed arrows in FIG. 1. The control unit 12 may be implemented through a computer or processor with associated program memory. Other types of realizations such as using Field-Programmable Gate Arrays (FPGAs) are also possible.

As can be seen later, such a control unit may be divided into a number of separate modules.

As was mentioned above, the upper and lower arms ua and Ia of the voltage source converter 10 in the example in FIG. 1 comprise cells. A cell is a unit that may be switched when transitioning between two voltage levels at the junction j. It is more particularly provided for giving the edges of pulses generated at the junction j a slope, which is a positive slope when transitioning from −Vdc/2 to +Vdc/2 and a negative slope when transitioning from +Vdc/2 to −Vdc/2. Positive and negative slopes are here two types of slopes that can be provided in the transition. A cell with unipolar voltage contribution capability, such as a cell having a half-bridge structure, is suitable for use in the upper and lower arms ua and Ia. An example of such a cell is schematically shown in FIG. 2A.

The cell Cua1 shown in FIG. 2A comprises a first main switch MSW and in parallel with this first main switch MSW there is a branch comprising a snubber capacitor Csn in series with a first auxiliary switch ASW. A first connection terminal of the cell Cua1 is in this case provided at a first junction between the two switches MSW and ASW, where a first end of the first main switch MSW is connected to this first junction and a second connection terminal is provided at a second end of the main switch MSW. The cell Cua1 may be switched to provide a voltage contribution corresponding to the voltage of the snubber capacitor Csn or a zero-voltage contribution. When providing a voltage corresponding to the voltage of the snubber capacitor Csn, the cell Cua1 inserts the voltage of the snubber capacitor Csn in the arm in which it is included. When no voltage or a zero voltage is provided by the cell Cua1, then the snubber capacitor Csn is bypassed and thereby the voltage is removed. The cells may thereby be considered to be inserted or alternatively bypassed. In the examples given here the switches are realized as semiconductor switches in the form of Metal Oxide Semiconductor Field Effect Transistor (MOSFET) switches, which may be provided on a suitable substrate such as Silicon (S) or wide band-gap semiconductors such as Silicon Carbide (SiC) or Gallium Nitride (GaN), where wide band-gap semiconductors are preferred. A switch is thereby an Si switch or a SiC/GaN switch. It should be realized that other types of semiconductor realizations may be used such as a Junction Field Effect Transistor (JFET) or an Insulated Gate Bipolar Transistor (IGBT) and anti-parallel diode on suitable substrate such as Si or SiC. The anti-parallel diode in FIG. 2 is a MOSFET body diode. It is as an alternative possible to provide the diode as an external diode.

The converter with the above-mentioned type of cells is a quasi two-level (Q2L) or integrated capacitor-blocked transistor (ICBT) converter. The traditional way to control such a converter is to compare a two-level reference with a single carrier wave in order to determine that a switching transition is to occur. Once a switching transition occurs, a delay unit generates a stepped transition, where the time it takes for this transition to be completed is a dwell time $t_D$. The time between two consecutive steps may in turn be $t_D/(N_{cell}-1)$, where $N_{cell}$ is the number of cells used in the phase arm. In parallel a cell sorting algorithm may list the cells in ascending or descending order according to the polarity of the AC output current. Then, according to the list provided by the sorting algorithm, a switching signal stemming from each change in the stepped waveform is assigned to a cell. A consequence of relying on a delay unit is that the stepped waveform does not start ramping up or down before the two-level switching event occurs. Consequently, a delay of half the dwell time, i.e. $t_D/2$ is present in the output voltage waveform, originating from the delay unit.

The problem with the above-mentioned traditional control is thus that it uses a delay unit. The delay unit introduces an additional time delay in the output converter waveforms, which may be a serious limitation in an ICBT converter because of the short time intervals.

It is therefore of interest to provide a faster control.

Aspects of the invention are directed towards such control with less delay.

How such a control performed by the control unit 12 of FIG. 1 can be generally carried out will now be described with reference to FIG. 3, which shows a flow chart of a number of method steps in a method of controlling the converter 10.

The control unit 12 controls the cells of a phase leg to output a train of pulses of a trapezoidal shape, where the train of pulses results in a waveshape, such as a cyclical waveshape, that is generated on the AC terminal AC1. The control unit 12 more particularly generates control signals, where all cells that participate in the forming of the waveshape receive a control signal. At least one cell of the phase leg may be controlled with a corresponding control signal, the starting point of which is adjusted in relation to the control signals provided for at least one of the other cells.

More particularly, in this control the generation of a first control signal sent to a first cell Cua1 used to initiate a transition between two levels of a pulse coincides with the decision that a transition is to be made, step 14

Through the generation of the first control signal coinciding with the decision that a transition is to be made, there is no delay between this transition decision and the generation of the first control signal. The generation of the first control signal can alternatively be considered to follow the transition decision without delay.

The decision that a transition is to be made may additionally be carried out through a comparison between a carrier and a reference performed for the first cell. Furthermore, either the carrier or the reference may be dedicated to the first cell and the other may be common for all the cells. This means that if the carrier is dedicated to first cell, the reference is common for all the cells and vice versa.

Thereby the start of the first control signal generated for the first cell and used to initiate a transition between two levels of a pulse coincides with the decision that a transition is to be initiated, where the decision that a transition is to be initiated may be made through a comparison between a carrier and a reference performed for the first cell.

In the forming of a pulse, it is according to one variation of the method possible that the control unit 12 controls the first and a second cell Cua1 and Cua2 with a first and second control signal in a sequence used for a transition where the first control signal starts before the second control signal starts and ends before the second control signal ends, step 14a. In this case it is also possible that the control signals have equal lengths.

In the forming of a pulse, it is according to another variation of the method possible that the control unit 12 controls the first and the second cell Cua1 and Cua2 with a first and second control signal in a sequence used for a transition, where the first control signal starts before the second control signal starts and ends after the second control signal ends, step 14b. In this case the first control signal may be the longest and the following control signals in a sequence of control signals used to make the transition have diminishing lengths in the order of the sequence, i.e. they get shorter and shorter.

The control may be performed based on comparing a group of phase-shifted carriers with a reference, where each carrier in the group is associated with each cell that is to receive a corresponding control signal. The phase shift may in this case depend on a dwell time, the number of cells used in the transition, the pulse number and an AC frequency at the AC terminal AC1, where the pulse number is the ratio between the AC frequency and the used switching frequency. The separation may more particularly depend on the dwell time divided by the number of cells minus one times a product comprising the pulse number and the AC frequency. Alternatively, the control may be performed based on comparing a carrier with a group of different references that are offset from each other, where each reference in the group is associated with each cell that is to receive a corresponding control signal. The offset may in this case depend on the dwell time, the number of cells used in the transition, the pulse number and an AC frequency at the AC terminal. The offset may also here depend on the dwell time divided by the number of cells minus one times a product comprising the pulse number and the AC frequency. As yet another alternative the control signals may be pre-stored in a table and fetched therefrom for application to the cells.

In the method it is additionally possible that the cells of a phase leg used to form the pulse train each receive a separate control signal, where these separate control signals may be timed differently from each other. They may thus start and end at different points in time.

Aspects of the invention are based on the use of the nearest level modulation principle. Therefore, it will now be described in order to provide a more detailed understanding of the various aspects disclosed herein. A modulation index, which is used as a reference for forming a waveshape in a phase leg or phase arm of a converter, is compared with fixed threshold levels that depend directly on $N_{cell}$. Alternatively, the nearest-level modulation is performing a rounding of the modulation index. If the modulation index is constrained between 0 and 1, the difference between two threshold levels is $1/N_{cell}$. It is worth noting that a constant slope modulation index waveform results in a stepped waveform with equally spaced steps.

A conventional two-level VSC operated with carrier-based modulation, presents a two-level switching pattern. Such a pattern can be alternatively described in terms of switching instants (or angles) and difference of switch position, that can be stored in look-up tables. The same idea is used for programmed modulation, e.g., selective harmonic elimination (SHE) or optimized pulse patterns (OPPs), where the aim is to shape the harmonic spectrum of the converter voltage by either removing low order harmonics (cf. SHE) or performing a larger optimization with user definable weighting factors (cf. OPPs).

An ICBT is operated in a similar way as a two-level VSC, with the difference that the transition between the DC terminals DC1 and DC2 (from positive terminal to negative terminal) provides dv/dt control through the dwell time $t_D$. As a consequence, the voltage waveform of an ICBT comprises stepped trapezoidal pulses resembling the steps of a conventional MMC. However, the time scale is significantly smaller. The dwell time $t_d$ is considerably smaller than the base PWM frequency fsw. Constructing from the previous finding that was providing equal step times, it is clear that any modulation, PWM or programmed, can provide a look-up table containing switching instants and difference of switch position. This set of parameters can be easily transformed to describe a trapezoidal pulse.

Figure 4:
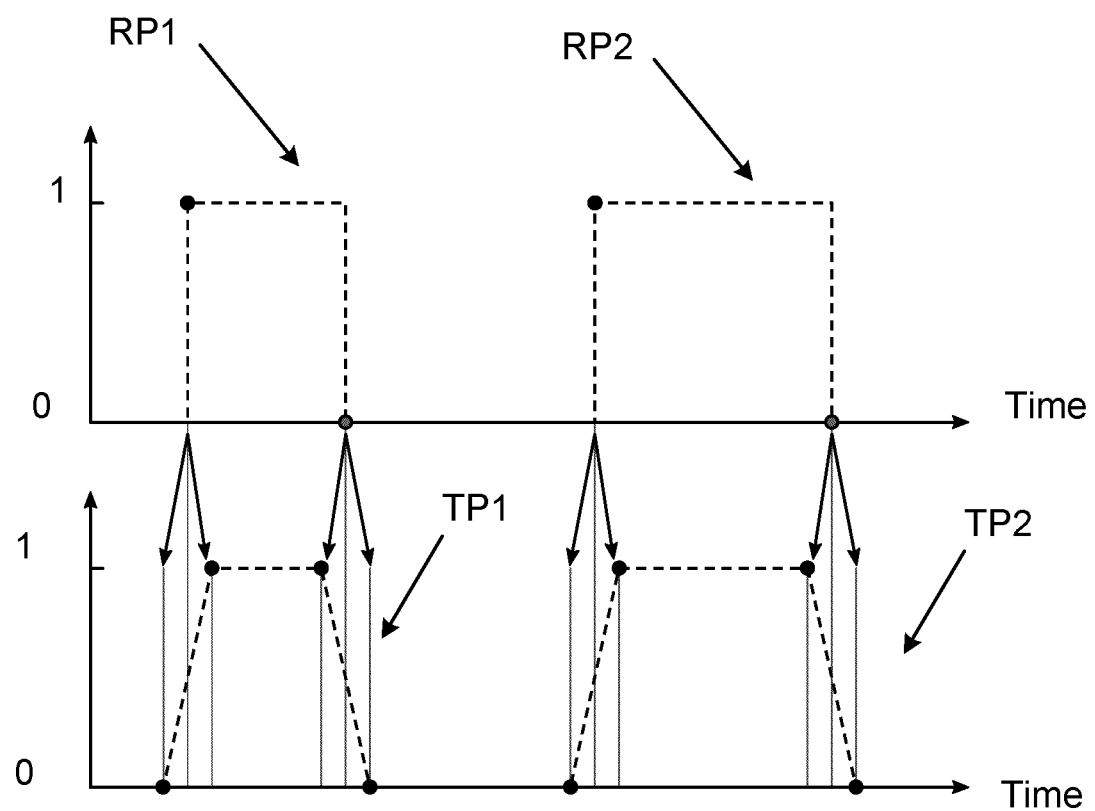

FIG. 4 schematically shows how such a conversion may be carried out, where the upper part of FIG. 4 shows rectangular pulses RP1 and RP2 having normalized pulse heights of 1 and an extension in time. The lower part of FIG. 4 shows corresponding trapezoidal pulses TP1 and TP2. The data about the time instances stored in the look-up table for a two-level pulse pattern with rectangle pulses RP1 and RP2 is shown with two points at opposite corners of each pulse. Each switching instant from the two-level pulse pattern is transformed into two symmetrically shifted time instants in the trapezoidal pulse pattern in order to construct the trapezoidal waveform. One of the points is probed at the 1-level of the rectangular pulse RP, which is translated into two points one at a 0-level and the other at the 1-level of the trapezoidal pulse, where these points have an offset of the same size in opposite directions along a time axis in relation to the rectangular pulse point. As can be seen in FIG. 4 that same operation takes place for the point at the 0-level of the rectangular pulse.

Note that the transition time of the trapezoidal reference is longer than the dwell time of the resulting stepped waveform. This is due to the fact that the dwell time is defined as the time between the first and last step in the transition of the stepped waveform (the transition between the dc terminals comprises ($N_{cell}-1$) flat parts), while the transition time $t_t$ of the reference trapezoidal waveforms last one additional flat step (½ step before the stepped transition starts and ½ step after it ends). This means $t_t=t_d*N_{cell}/(N_{cell}-1)$.

Instead of relying on constant threshold levels to generate the stepped waveform, it is also possible to use a tolerance band principle with constant tolerance bandwidths, since the voltage levels are equally distributed between the cells.

In the ICBT case, the reference is held constant over one or one-half carrier frequency, depending on the selected reference update method. The nearest-level modulation case can consequently match the ICBT modulation by applying a simple rotation.

At the light of this observation, it is obvious that the threshold levels of the ICBT modulation correspond to phase-shifted carriers.

Figure 5A:
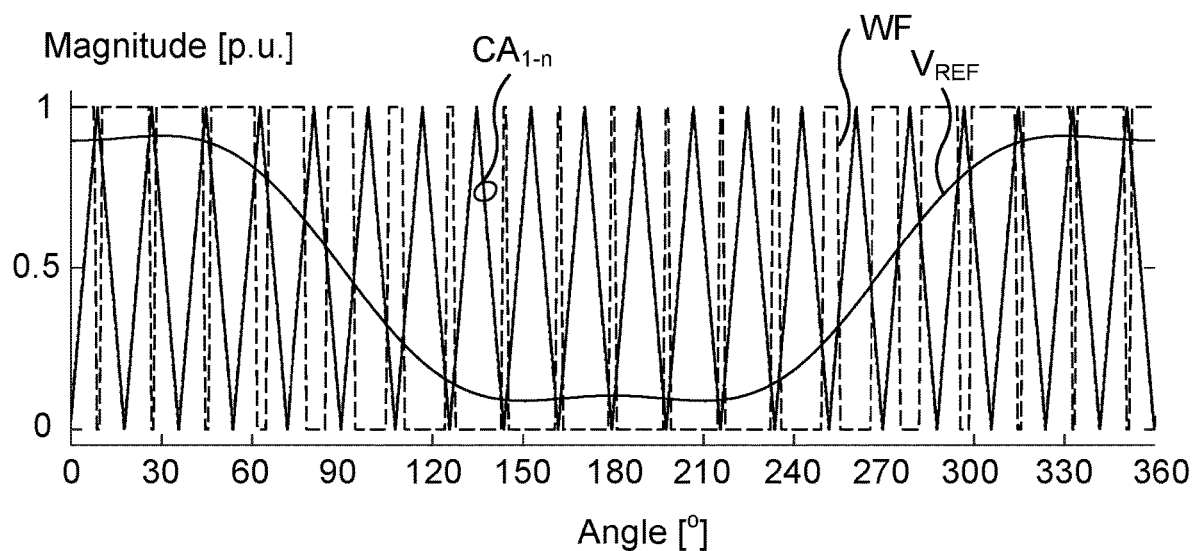
FIGS. 5a and 5b show a stepped ICBT modulation based on a first type of comparison between phase-shifted carriers with a sinusoidal and 3rd harmonic reference, where
Figure 5B:
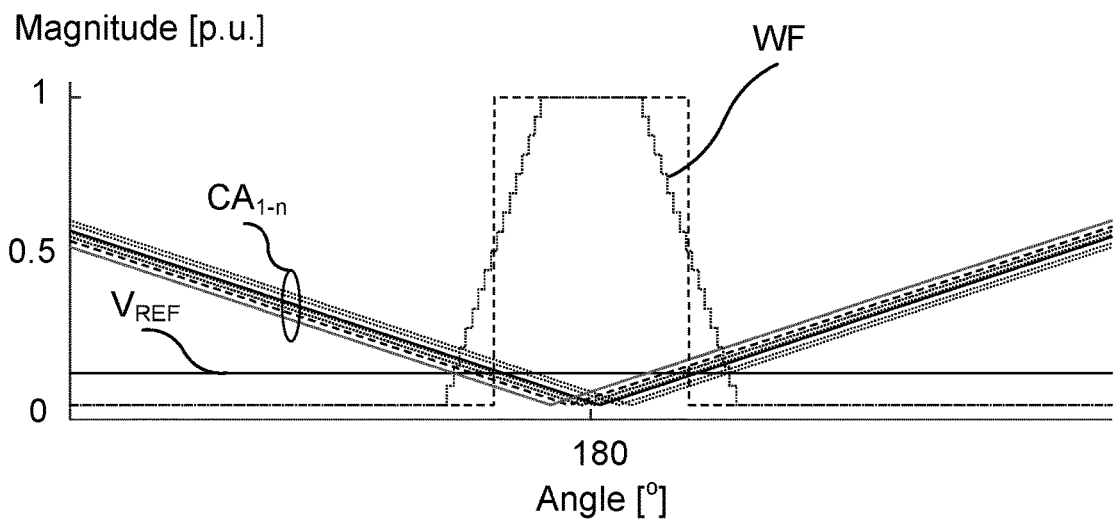

The use of phase-shifted carriers is shown in FIGS. 5a and 5b, which shows stepped ICBT modulation based on phase-shifted carriers with sinusoidal and 3rd harmonic reference. FIG. 5a represents a complete fundamental cycle for the waveshape WF and FIG. 5b is a magnification around 180°. It should here be realized that the use of $3^{rd}$ order harmonics is optional. It may thus be omitted. It is thus possible to only use the fundamental frequency. In addition to or instead of using $3^{rd}$ order harmonics, it is also possible to inject other common mode harmonics, i.e. other odd numbered harmonics.

In FIGS. 5a and 5b it can thus be seen that there is a first type of comparison where a single voltage reference VREF is compared with a group of carriers CA1-$n$ in order to generate a waveform WF comprising stepped trapezoidal pulses. The result of one comparison thus leads to a step in the pulse. It can be seen in FIG. 5a that the voltage reference Vref is sinusoidal with added $3^{rd}$ harmonics. Moreover, there is in this example one carrier provided for each cell that is to be switched. There is thus a one-to-one correspondence between carrier and cell. Furthermore, the decision to generate a pulse is made through the first of a number of consecutive comparisons between the carriers and the reference, where the steps in the pulse are obtained based on the results of these consecutive comparisons. It can be seen that the stepping is in phase with these comparisons. Consequently, there is also no delay between the generation of the control signals and the decision-making process.

The dashed rectangular pulse in FIG. 5b is the pulse from two-level PWM, which is just added for comparison and to highlight that the phase is equal to the ICBT one.

Note that the phase-shift angle brings a trade-off relationship between AC filter requirement and cell capacitor requirement (when the phase-shift increases, the capacitor requirement increases as well and tends to MMC values).

It can be seen that the control leads to the cells receiving equal sized control pulses, for turning on or off the cells in a sequence used for a transition between the two levels, where the pulses are staggered in time. They thus start at a time after each other that corresponds to the above-mentioned phase shift. As the pulses have equal lengths, they also end at times corresponding to the phase shift. A cell that is turned on directly after a previously turned on cell is also turned off after the previous cell is turned off.

After the transition has been made according to the sequence, the cells may be shuffled according to a sorting algorithm so that when a transition is later made other cells may act as first and second cells.

It may here be mentioned that there is a duality principle between carrier phase-shift and reference DC shifting. This means that the result from FIGS. 5a and 5b could be as well obtained from $N_{cell}$ reference signals that have a DC offset and a single carrier which is identical to a conventional two-level PWM modulation. The DC offset is defined as $t_D/N_{cell}*(p*f_g)$. The result is shown in FIGS. 6a and 6b, and the equality with the stepped waveform of FIGS. 5a and 5b is manifest.

Figure 6A:
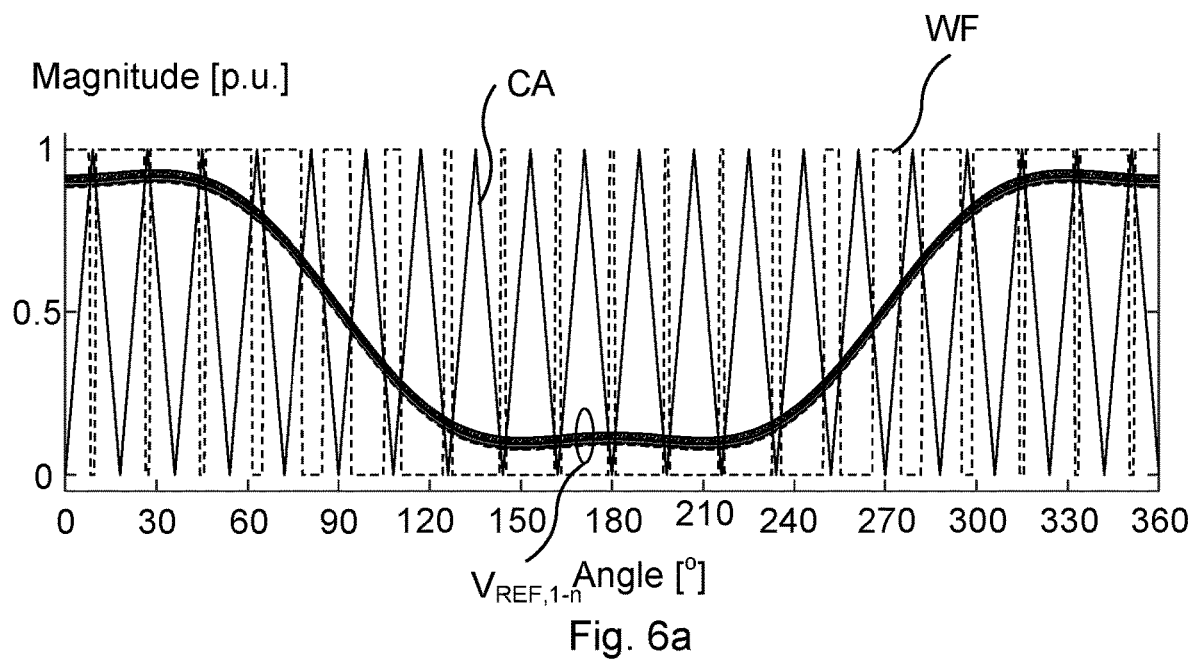
FIGS. 6a and 6b shows a duality version of the ICBT modulation method with a second type of comparison, this time with a single carrier and multiple reference waveforms with dc offset, where
Figure 6B:
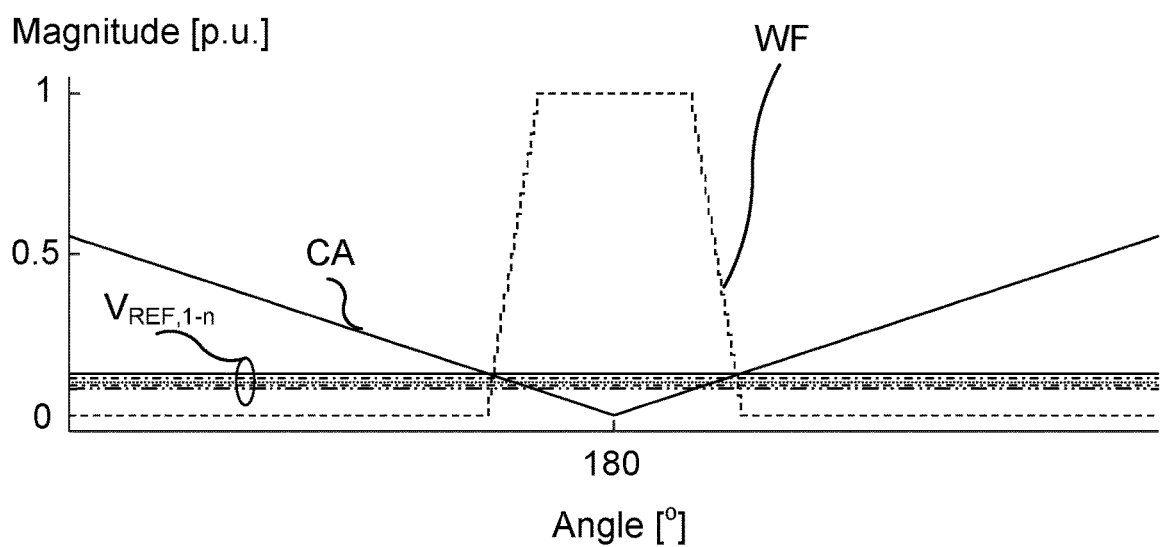

The use of DC offset is thus schematically shown in FIGS. 6a and 6b.

In the figures it can be seen that there is a second type of comparison where a group of references $V_{REF,1-n}$ is compared with a single carrier CA in order to generate a waveform WF comprising stepped trapezoidal pulses. The result of one comparison thus leads to a step in the pulse. It can be seen in FIG. 6a that the references are sinusoidal with added 3rd harmonics. The individual references are also offset from each other with an offset, which in this case is a DC offset. Moreover, there is in this example one reference provided for each cell that is to be switched. There is thus a one-to-one correspondence between reference and cell. Furthermore, the decision to generate a pulse is made through the first of a number of consecutive comparisons, where the steps in the pulse are obtained based on the results of these comparisons. Thereby the stepping is also in this case in phase with these comparisons. Consequently, there is also no delay between the generation of the control signals and the decision-making process.

The equality between the two types of comparisons is only maintained at the arm voltage level, since each cell will experience a different pulse-width, as opposed to the case with multiple carriers.

It can thus be seen in FIGS. 6a and 6b that the control leads to the cells receiving differently sized control pulses for turning on or off the cells in the sequence used for a transition, where the start as well as the end of the pulses are staggered in time. They thus start at a time after each other that corresponds to the above-mentioned offset. They also end after each other at a time that corresponds to the offset. However, the end is made in the opposite order compared to the start. The first pulse thus starts first as well as ends last in the sequence.

After the transition has been made according to the sequence, the cells may be shuffled according to a sorting algorithm so that when a transition is later made other cells may act as first and second cells.

Figure 7A:
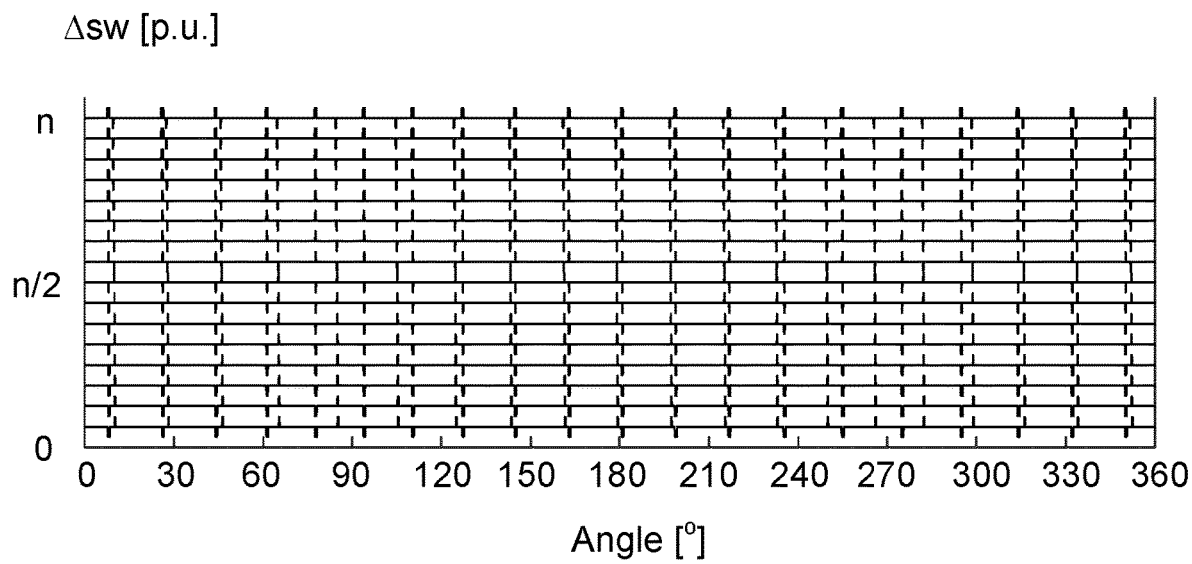
FIGS. 7a and 7b show differences in length between control signals obtained according to the two types of comparisons for a number of cells where
Figure 7B:
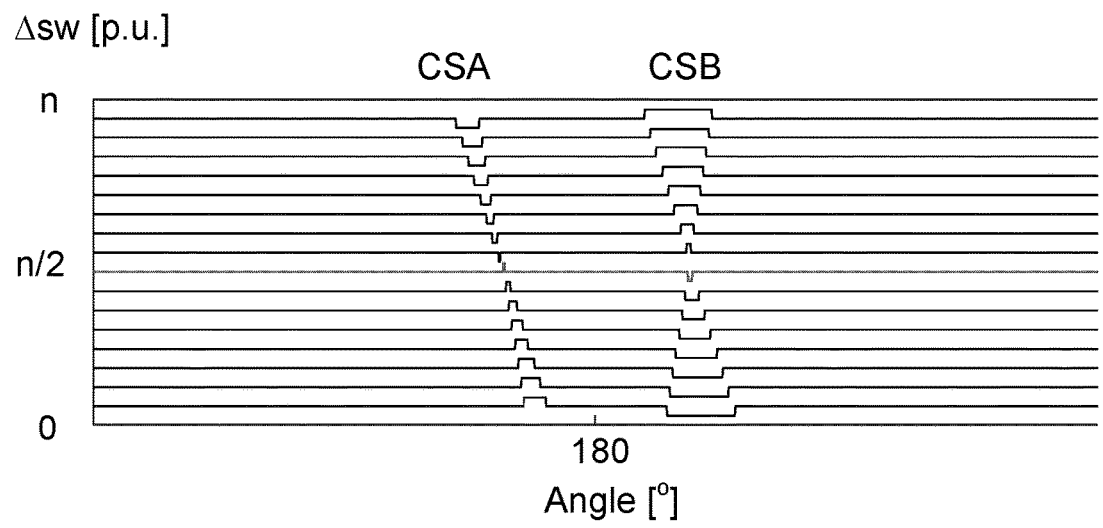

The difference between the pulse widths is shown in FIGS. 7a and 7b, which shows a time difference Δsw between the control signals generated according the two types of comparisons. In the figure a horizontal line corresponds to the control signal for a cell.

In the figures the steps used for forming a pulse were shown as having equal lengths. The durations of the steps were thus equal i.e., the stepped waveforms had equal step times. It should be realized that it is possible to vary this parameter in order to obtain a desired pulse slope of the pulses. It is in a similar manner also possible to vary the DC offset.

It is thereby also possible to vary the dwell time. In this way it is possible to generate any waveform from sinusoid to square wave by changing the phase shift angle or DC offset. The dwell time may in fact even be random, for instance in order to mitigate EMI-range harmonic voltage.

As was seen above, the transition from one level to the other is made up of a number of steps made during a dwell time. The separation between the steps may depend on the dwell time, the number of cells used in the transition, the pulse number and the AC frequency at the AC terminal. The separation may more particularly depend on a quotient between the dwell time and the number of cells minus one times a product comprising the pulse number and the AC frequency.

A carrier synchronization between the individual cell control is implicitly assumed and may need to be provided at an arm control level at sparse intervals (the clock drift is not large).

The phase-shifted carrier based ICBT modulation method may require that the modulation indices need to be transferred to the part of the control unit performing cell control, which as can be seen later may be a cluster-level control module. This signal may be updated once or twice per base frequency depending on the selected update scheme.

Figure 8:
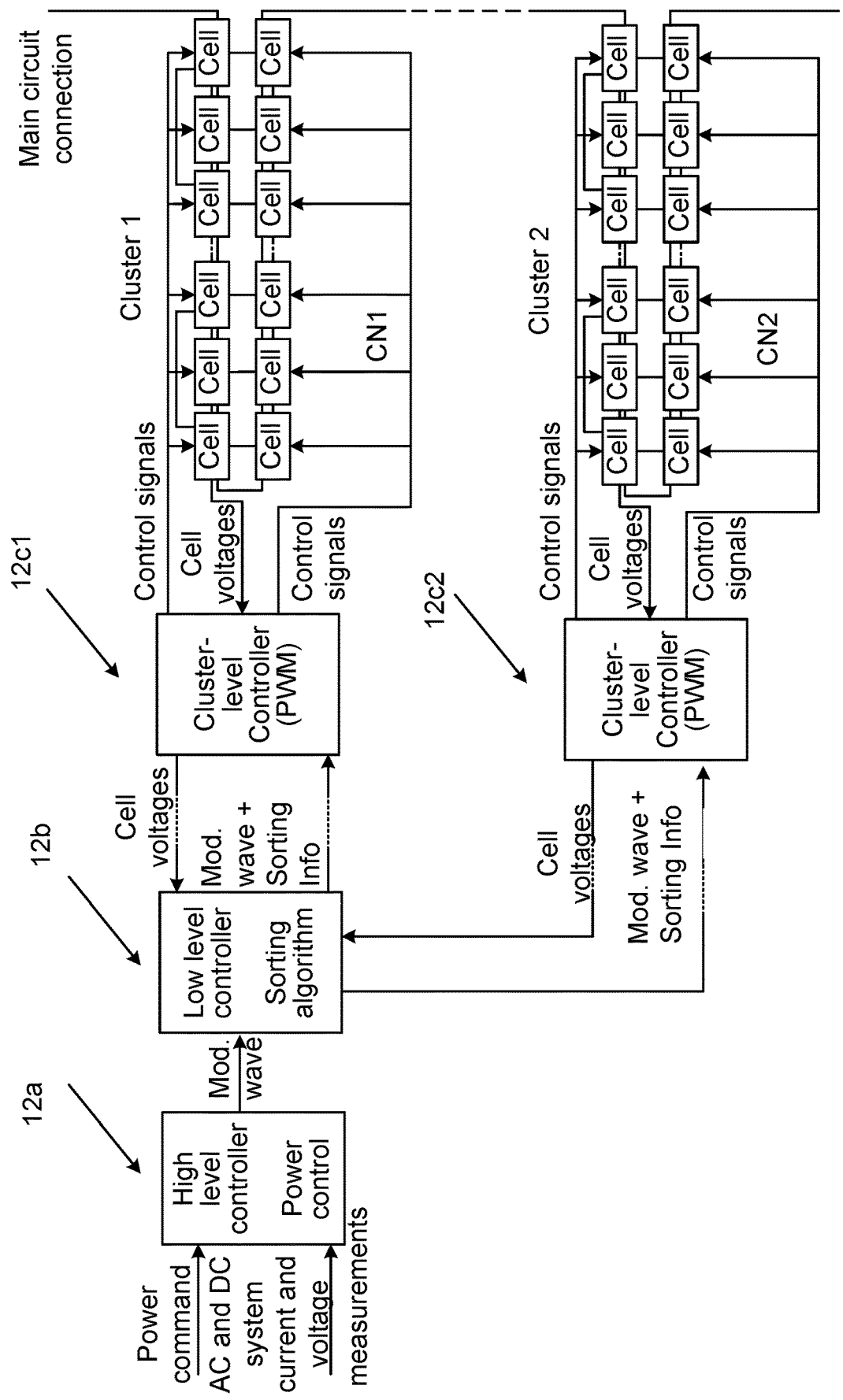
FIG. 8 shows a number of modules of the control unit, two communication networks and two clusters of cells.

FIG. 8 shows a control structure used to control the cells. The control unit is in this case divided into a number of control modules. There is a high-level control module 12a that receives a control reference such as a power reference as well as a voltage phase and altering current measurements and generates a modulation wave, which modulation wave is provided to a low-level control module 12b. The low-level control module 12b is in turn connected to a first and a second cluster-level control module 12c1 and 12c2, where a cluster-level control module is a control module controlling a cluster of cells. The first cluster-level control module 12c1 is connected to a first cluster of cells Cluster 1 via a first cell communication network CN1 and the second cluster level control module 12c2 is connected to a second cluster of cells Cluster 2 via a second cell communication network CN2. The communication networks may comprise a mesh-like or multi-hop communication structure that is based on optical fibers and that allows fast and redundant message propagation. Such a network may be used for collecting cell voltages of the cells and supply them to the corresponding cluster-level control module 12c1 and 12c2. However, the control signals may be transferred to the cells using individual dedicated optical fiber links between each cell and the cluster-level control module 12c1 and 12c2 to allow ultra-fast broadcast communication in order to achieve high-accuracy synchronization. Thereby each cluster-level control module 12c1 and 12c2, each has a number of direct links to the cells in its cluster, which links in this case thus are optical point-to-point links.

The cluster level control unit 12c1 and 12c2 receives the cell voltage measurements from the cells and forwards these to the low-level control module 12b. The low-level control module 12b then sorts the cells and based on the sorting supplies a modulation wave and sorting information corresponding to the cells to the cluster level control units 12c1 and 12c2. Each cluster-level control unit 12c1 and 12c2 then performs pulse width modulation (PWM), which can be using either the first or the second type of comparison, and achieves relative synchronization among clusters. Based on the comparison a cluster-level control module 12c1 and 12c2 then generates control signals for the clusters of cells connected to it and sends the signals to the cells of the clusters using the dedicated optical links of the communication networks CN1 and CN2. It should here be realized that as an alternative to the first and second types of comparisons, it is possible to use a pre-stored look-up able. A cluster-level control unit 12c1 and 12c2 thereby generates the control signals for at least a cluster of the cells in a phase arm.

Thereby the control is fast.

Figure 9:
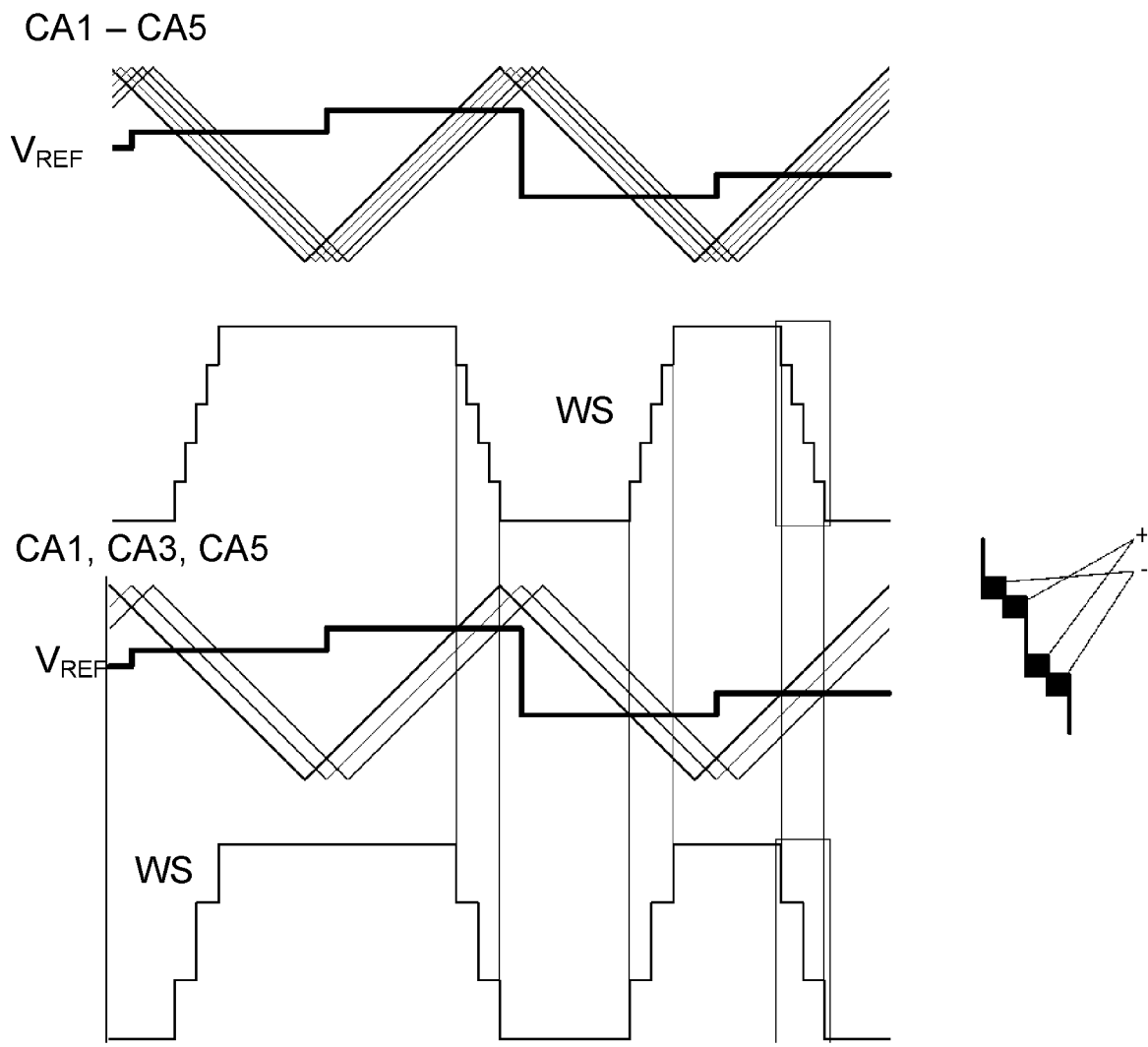
FIG. 9 shows the combination of carriers in order to obtain a reduction of steps in the stepped waveform.

It is possible to vary the control through extending the step time. FIG. 9 shows an example of this. The multiple carrier waveforms for the phase-shifted PWM method is combined so that some cells in the cluster are controlled using the same control signal. In this example this is done through combining two carriers. There is thus a first to fifth carrier CA1-CA5, where the first and second carriers are combined into the first carrier CA1 and the third and fourth carriers are combined into the third carrier CA3, the fifth carrier CA5 may in turn remain unchanged, for instance through being the last in the sequence. This can also be seen as removing the second and the fourth carriers. The control signal obtained through the comparison with the first carrier CA1 is then used for a first and a second cell, the comparison made with the third carrier CA3 is used for a third and a fourth cell while the comparison made with the fifth carrier CA5 is used for a fifth cell. At least two cells in a phase leg used to form the pulse train may thus receive the same control signal. It can thereby be seen that the phase shift between the remaining carriers is increased and, in this example, doubled. The length of a step caused by the control signal may thus be longer than the corresponding individual steps of differing control signals. Thereby a reduced number of steps and an increased step time is made. The step width can be increased by twice at the expense of the twice higher step voltage than the non-cluster case. The number of clustered cells can be designed according to the need of control unit and dv/dt requirements on the AC terminal.

It is possible to replace the direct optical links with wireless links. In this case it is possible to use wireless time division multiple access (TDMA) for the cells, where each cell receives a command in a dedicated time slot of a TDMA frame. It can thereby be seen to in this case separate TDMA time slots of a wireless TDMA frame are used as the direct links between the cluster-level control unit and a cluster of cells.

The invention has a number of advantages. It provides faster control. The modulation is also simplified. In addition, some modulation methods can be distributed to the cluster-level control module, which lowers the communication bandwidth requirement between the low-level control module and the cluster-level control module (a modulation index is transmitted, instead of switching pulses)

As was mentioned earlier, the control unit. and more particularly at least the cluster-level module of the control unit, may be provided in the form of a processor with associated program memory including computer program code for performing its functionality or in the form of a digital signal processor (DSP), Application Specific Integrated Circuit (ASIC) or Field-Programmable Gate Array (FPGA).

Figure 10:
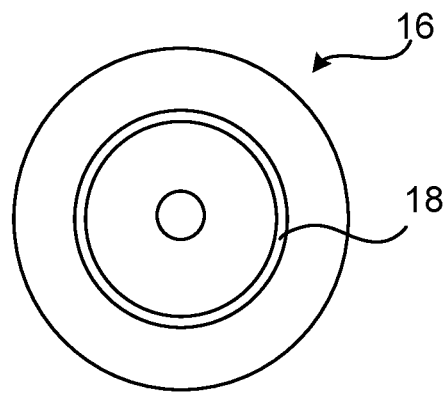
FIG. 10 shows a storage medium on which computer program code for realizing the control functionality is stored.

A computer program may also be a computer program product, for instance in the form of a computer readable storage medium or data carrier carrying a computer program with the computer program code, which will implement the functionality of the above-described control unit and more particularly at least the cluster-level module of the control unit when being loaded into and acted upon by a processor. One such computer program product in the form of a CD ROM disc 16 with the above-mentioned computer program code 18 is schematically shown in FIG. 10

From the foregoing discussion it is evident that the present invention can be varied in a multitude of ways. It shall consequently be realized that the present invention is only to be limited by the following claims.

The invention claimed is:

1. A voltage source converter comprising:
at least one phase leg connected between a first DC terminal having a first voltage and a second DC terminal having a second voltage, the phase leg including an upper arm and a lower arm with cells, where the junction between the arms is connected to a corresponding AC terminal, the converter further including a control unit configured to:
control the cells to output a train of pulses of trapezoidal shape where the generation of a first control signal for a first cell used to initiate a transition between two levels of a pulse coincides with the decision that a transition is to be made,
wherein the decision that a transition is to be made is carried out through a comparison between a carrier and a reference performed for the first cell, which reference is a sinusoidal reference.

2. The voltage source converter according to claim 1, wherein at least one cell of a phase leg is controlled with a corresponding control signal, the starting point of which is adjusted in relation to the control signals provided for at least one of the other cells of the phase leg so that the first control signal for the first cell starts before a second control signal for a second cell starts.

3. The voltage source converter according to claim 2, wherein the first control signal for the first cell ends before the second control signal for the second cell ends.

4. The voltage source converter according to claim 3, wherein the control signals are generated through comparing a group of phase-shifted carriers with a reference, where each carrier in the group is associated with each cell that is to receive a corresponding control signal.

5. The voltage source converter according to claim 2, wherein the first control signal for the first cell ends after the second control signal for the second cell ends.

6. The voltage source converter according to claim 5, wherein the control signals are generated through comparing a carrier with a group of references that are offset from each other, where each reference in the group is associated with each cell that is to receive a corresponding control signal.

7. The voltage source converter according to claim 1, wherein data of the control signals is pre-stored in a table and fetched therefrom for application to the cells.

8. The voltage source converter according to claim 1, wherein the cells of a phase leg used to form the pulse train each receive separate control signals.

9. The voltage source converter according to claim 1, wherein at least two cells in a phase leg used to form the pulse train receive the same control signal.

10. The voltage source converter according to claim 1, wherein the control unit comprises a control module where the control signals for at least a cluster of the cells in a phase arm are generated and the control module has a number of direct links to the cells in the cluster.

11. The voltage source converter according to claim 10, wherein the links are optical point-to-point links.

12. The voltage source converter according to claim 10, wherein the links are separate time division multiple access time slots of a wireless time division multiple access frame.

13. The voltage source converter according to claim 1, wherein the AC terminal is an AC terminal for connection to an AC system.

14. A method of controlling a voltage source converter comprising
at least one phase leg connected between a first DC terminal having a first voltage and a second DC terminal having a second voltage, the phase leg including an upper arm and a lower arm with cells, where the junction between the arms is connected to a corresponding AC terminal, the method including the steps:
controlling the cells of the phase leg to output a train of pulses of trapezoidal shape, where the generation of a first control signal for a first cell used to initiate a transition between two levels of a pulse coincides with a decision that a transition is to be made, and
wherein the decision that a transition is to be made is carried out through a comparison between a carrier and a reference performed for the first cell, which reference is a sinusoidal reference.

15. The method according to claim 14, wherein the control comprises controlling at least one cell of a phase leg with a corresponding control signal, the starting point of which is adjusted in relation to the control signals provided for at least one of the other cells in the phase leg so that the first control signal for the first cell starts before a second control signal for a second cell starts and ends before the second control signal ends or is adjusted so that the first control signal starts before the second control signal and ends after the second control signal ends.

16. A computer program product for controlling a voltage source converter having at least one phase leg connected between a first DC terminal with a first voltage and a second DC terminal with a second voltage, each phase leg including an upper arm and a lower arm with cells, where the junction between the arms is connected to a corresponding AC terminal, said computer program product also including a data carrier with computer program code configured to cause a control unit to, when said computer program code is loaded into said control unit,
control the cells of the phase leg to output a train of pulses of trapezoidal shape, where the generation of a first control signal for a first cell used to initiate a transition between two levels of a pulse coincides with a decision that a transition is to be made, and
wherein the decision that a transition is to be made is carried out through a comparison between a carrier and a reference performed for the first cell, which reference is a sinusoidal reference.

* * * * *